United States Patent
Roncillat et al.

[11] 3,878,537
[45] Apr. 15, 1975

[54] MULTIPLEXED LIQUID-CRYSTAL DISPLAY DEVICE

[75] Inventors: Michel Roncillat; Michel Hareng, both of Paris, France

[73] Assignee: Thomson-CSF, Paris, France

[22] Filed: Apr. 16, 1973

[21] Appl. No.: 351,615

[30] Foreign Application Priority Data
Apr. 17, 1972 France .............................. 72.13441

[52] U.S. Cl. ...................... 340/324 M; 350/160 LC
[51] Int. Cl. ............................................. G02f 1/18
[58] Field of Search ................ 340/324 M, 166 EL; 350/160 LC

[56] References Cited
UNITED STATES PATENTS

| | | | |
|---|---|---|---|
| 3,645,604 | 2/1972 | Ngo .............................. | 350/160 LC |
| 3,653,745 | 4/1972 | Mao .............................. | 340/166 EL |
| 3,654,606 | 4/1972 | Marlowe et al. ................ | 340/324 M |
| 3,750,139 | 7/1973 | Blishak ......................... | 350/160 LC |

OTHER PUBLICATIONS
IBM Tech. Discl. Bull., Vol. 15, No. 8, 1/73, pp. 2,540–2,541, Light Scanner Employing A Nematic Liquid Crystal:Freiser.
IBM Tech. Discl. Bull., Vol. 15, No. 8, 1/73, pp. 2,538–2,539, Multicolor Display: Auiram et al.

*Primary Examiner*—John W. Caldwell
*Assistant Examiner*—Marshall M. Curtis
*Attorney, Agent, or Firm*—Cushman, Darby & Cushman

[57] ABSTRACT

The present invention relates to a display device employing optical properties of double refraction and dynamic scattering exhibited by nematic liquid crystals when subjected to an electric field. The invention has the object of simplifying the control of display panels using assembly of nematic liquid crystal cells, by employing the method known as multiplexing through relevant application of the physical properties of said liquid crystals. A control voltages distribution, such that a uniform voltage is applied across the non-excited cells, and a voltage three times higher across the excited cells, is described. When double-refraction operation is utilised, a better contrast between excited and non-excited cells can be achieved by applying across the non-excited cells a control voltage much greater than the threshold voltage beyond which the double refraction phenomenon occurs in the crystal. The invention is applicable in particular to the production of display panels, flat screens or image display devices for the holographic stores of optical calculators.

12 Claims, 14 Drawing Figures

MULTIPLEXED LIQUID-CRYSTAL DISPLAY DEVICE

The present invention relates to electrically controlled display devices, employing the optical properties of thin films of nematic liquid crystals to which an electric field is applied.

Those skilled in the art will appreciate that by applying a direct or alternating voltage between the faces of a thin film of a nematic crystal, it is possible, depending upon the frequency and magnitude of the voltage used, to bring about substantial modifications of the optical properties of the film. Very strong variations in double-reflection, through small voltage variations, make it possible, by associating with the film a set of polarizing plates, to modulate either the intensity of monochromatic radiation or the colour of polychromatic radiation. It is also possible to utilise the phenomenon known as dynamic scattering, which corresponds to the appearance within the initially perfectly transparent crystal, of substantial diffusion as soon as a threshold voltage is exceeded.

The implementation of one or the other of these phenomena enables, by arranging side by side individual cells each made up of such a thin film enclosed between transparent electrodes, to create display devices in the form of panels that can, for example, provide the electrically controlled display of characters.

The advantages of this kind of solution are numerous: ease of production and low coat of the cells, low control voltages and power. However, as soon as the number of elementary cells increases, the problem of the complexity of the control circuits comes into play.

The specific object of the present invention is an electrical control system for a nematic liquid crystal display panel. The invention proposes the exploitation of the integrating properties of this kind of material, these properties resulting from the shortness of the time required to establish the double refraction or diffusion phenomena, compared with the time taken for them to disappear, in order to bias each elementary cell by using voltage pulses, direct or alternating, repeated at fixed frequency, the constant duration of these pulses being short compared with the time taken for the phenomenon in question to establish itself. The invention thus achieves to apply to the control of these panels, the method known by the name of multiplexing, and this leads to a substantial simplification of the circuitry.

According to the present invention, there is provided an electrically controlled display device utilising a nematic liquid crystal and comprising:

at least one pair of plates, said pair of plates enclosing a thin film of said liquid crystal;
electrodes positioned on said plates for applying a transverse electrical bias to portions of said film;
means for illuminating said film;
P column and Q row electrical terminals, P and Q being whole numbers greater than unity;
first and second electrical bias means;
each said terminal being connected to at least one electrode;
said first and second bias means being respectively associated with said row and said column terminals;
said second means successively applying to each of said P column terminals a control voltage $E_c(t)$, at a periodicity of T and for a time period of $t_1$ not exceeding T/P, in order to successively raise the potential of said terminals, during said time period and at said periodicity, from a reference electrical potential $V_R$ to an electrical potential $V_R + E_c(t)$;
said first means applying simultaneously to each of said row terminals one of the two control voltages $E_{1L}(t)$ and $-E_{2L}(t)$ for causing electrical potential variations of one and the same said row terminal from one to the other of the two values $V_R + E_{1L}(t)$ and $V_R - E_{2L}(t)$, each said variation, when occuring, being synchronous with the application of said voltage $E_c(t)$ to one of said column terminals;
said control voltages $E_c(t)$, $E_{1L}(t)$ and $E_{2L}(t)$ being capable of varying as a function of time $t$ and having respective peak values $E_c$, $E_{1L}$ and $E_{2L}$;
said transverse electrical bias applied to a said portion of said film being thus able to change from one to the other of the four values $E_{L1}(t)$; $E_{L2}(t)$, $E_c(t) - E_{L1}(t)$ and $E_c(t) + E_{L2}(t)$;
said film undergoing changes in magnitude of its optical effect when varying said transverse electrical field applied;
said values $E_{21}(t)$, $E_{L2}(t)$ and $E_c(t) - E_c(t)$ giving rise to a same first magnitude of said optical effect;
and said value $E_c(t) + E_{L2}(t)$ giving rise to a second magnitude of said optical effect, said second magnitude being higher that said first magnitude.

For better understanding of the invention as well as other objects and further features thereof, reference is made to the following detailed disclosure of the preferred embodiments of the invention taken in conjunction with the accompanying drawings thereof, wherein.

Figure 5:
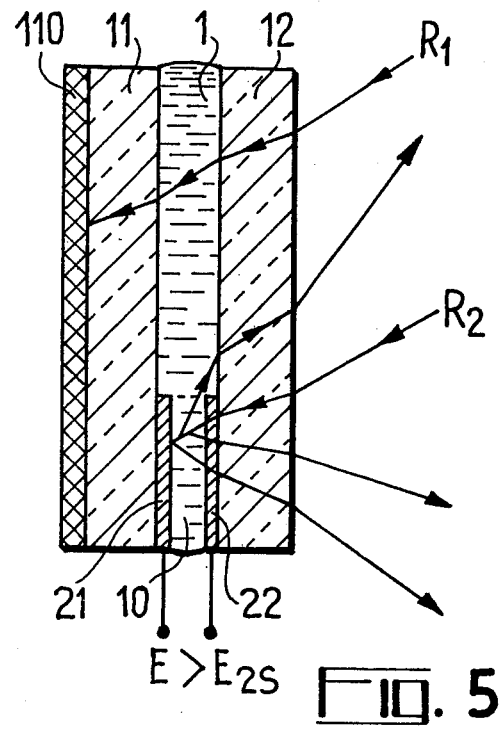
Figure 6:
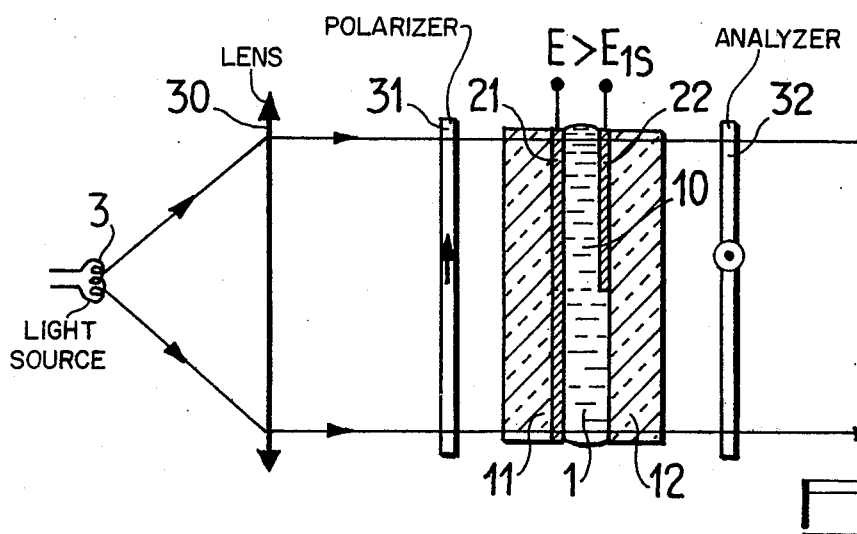
Figure 7:
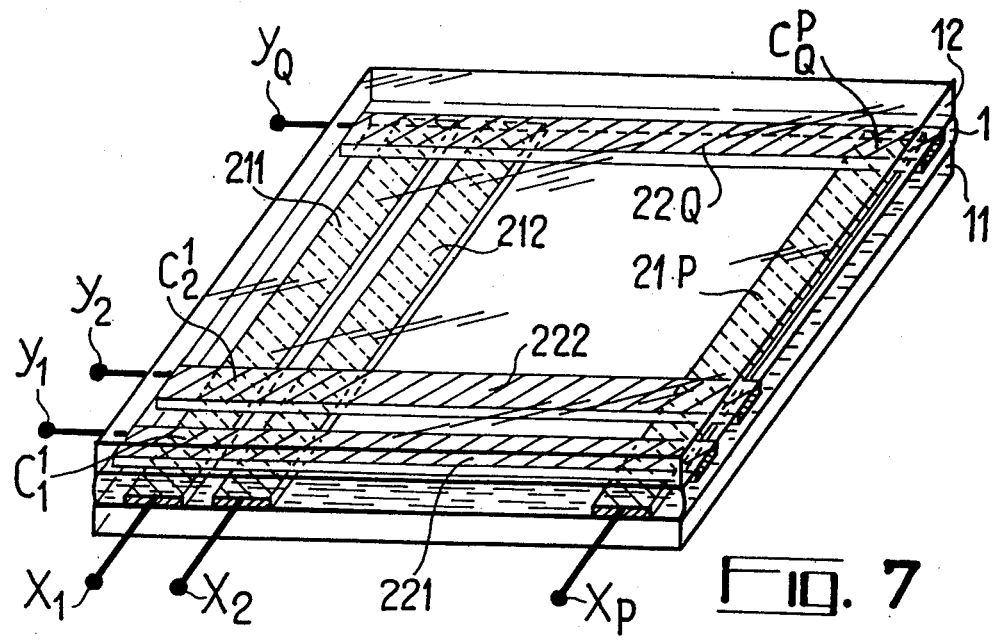
Figure 8:
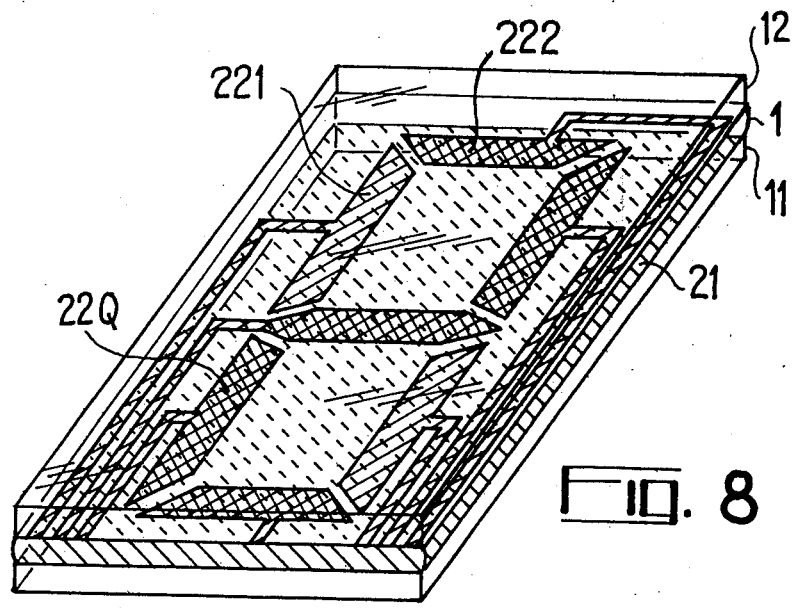
Figure 9:
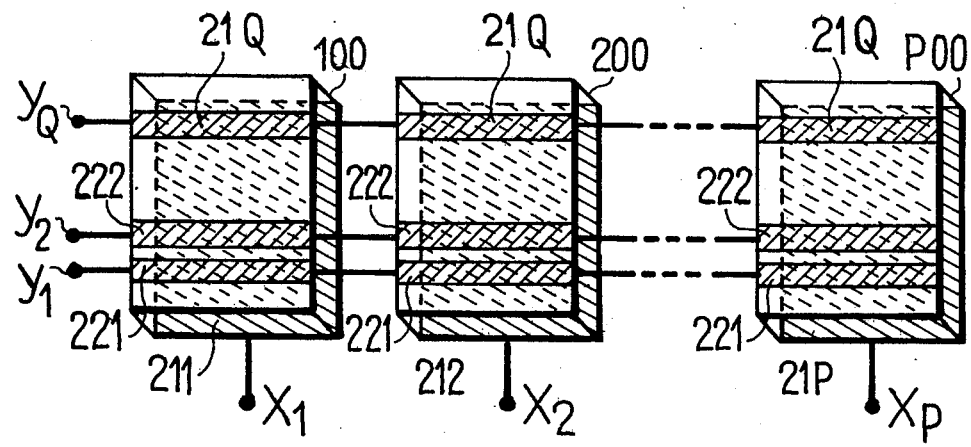
Figure 13:
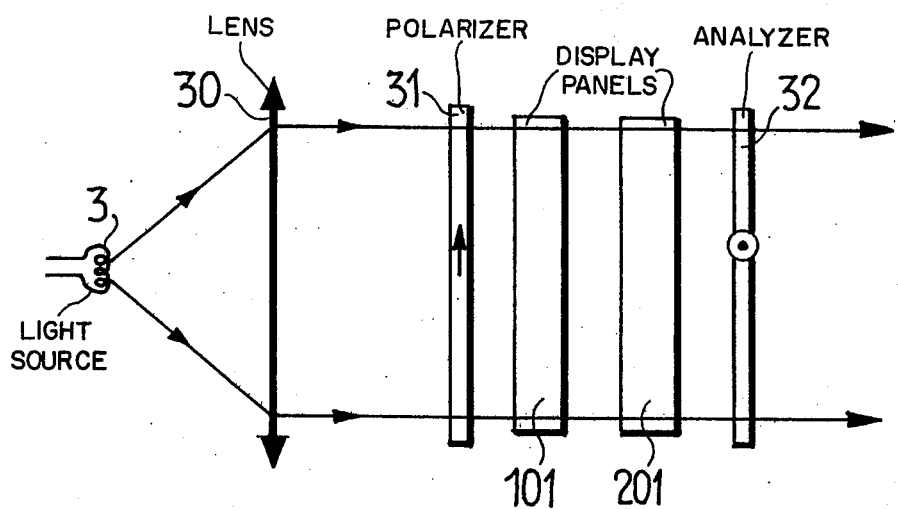
Figure 10:
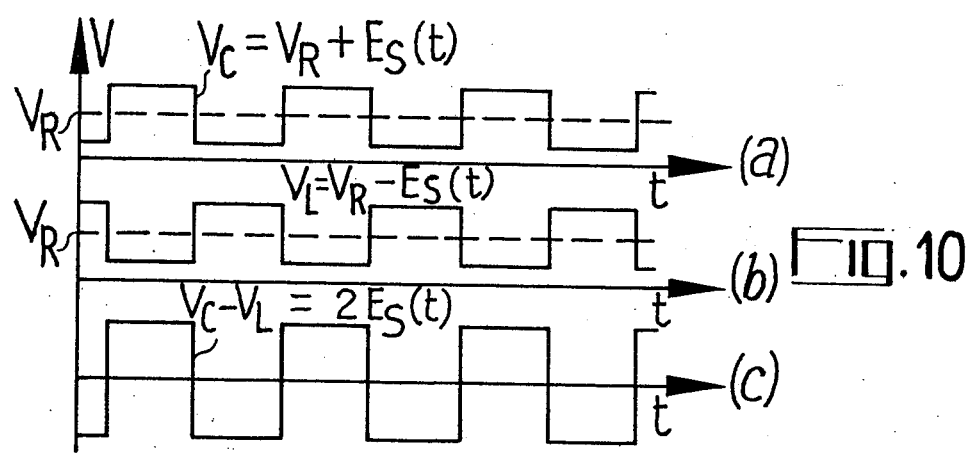
Figure 11:
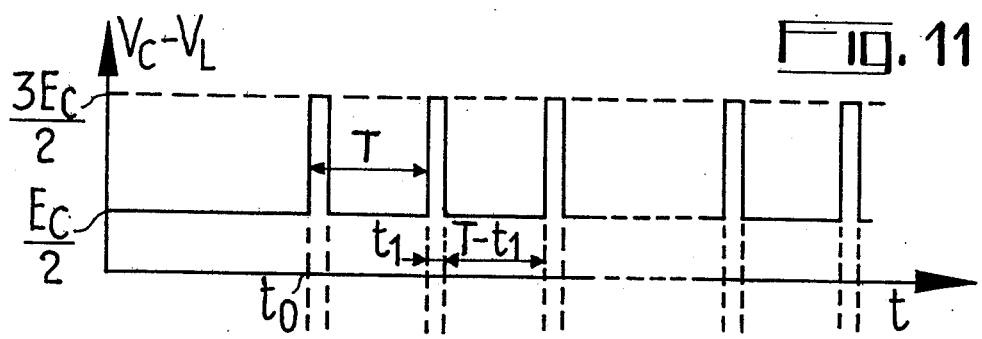
Figure 12:
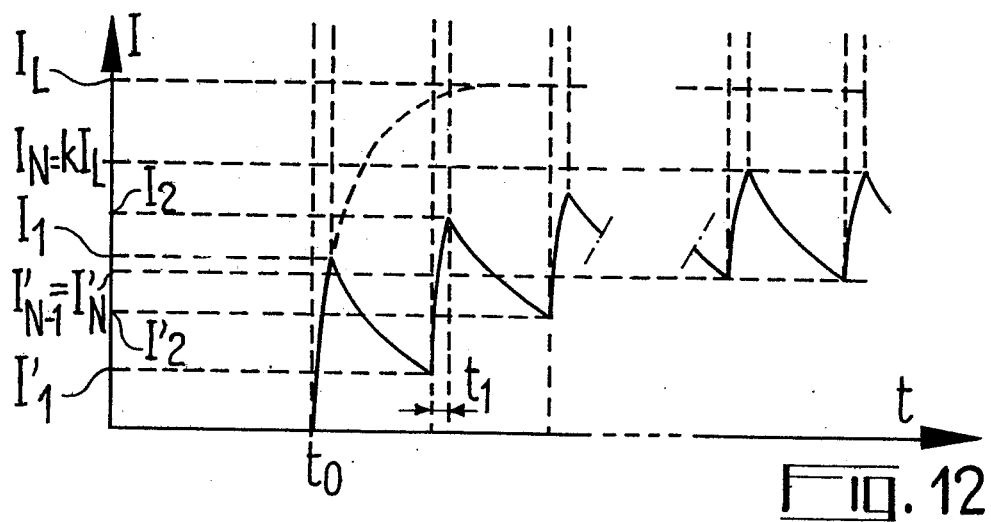
Figure 14:
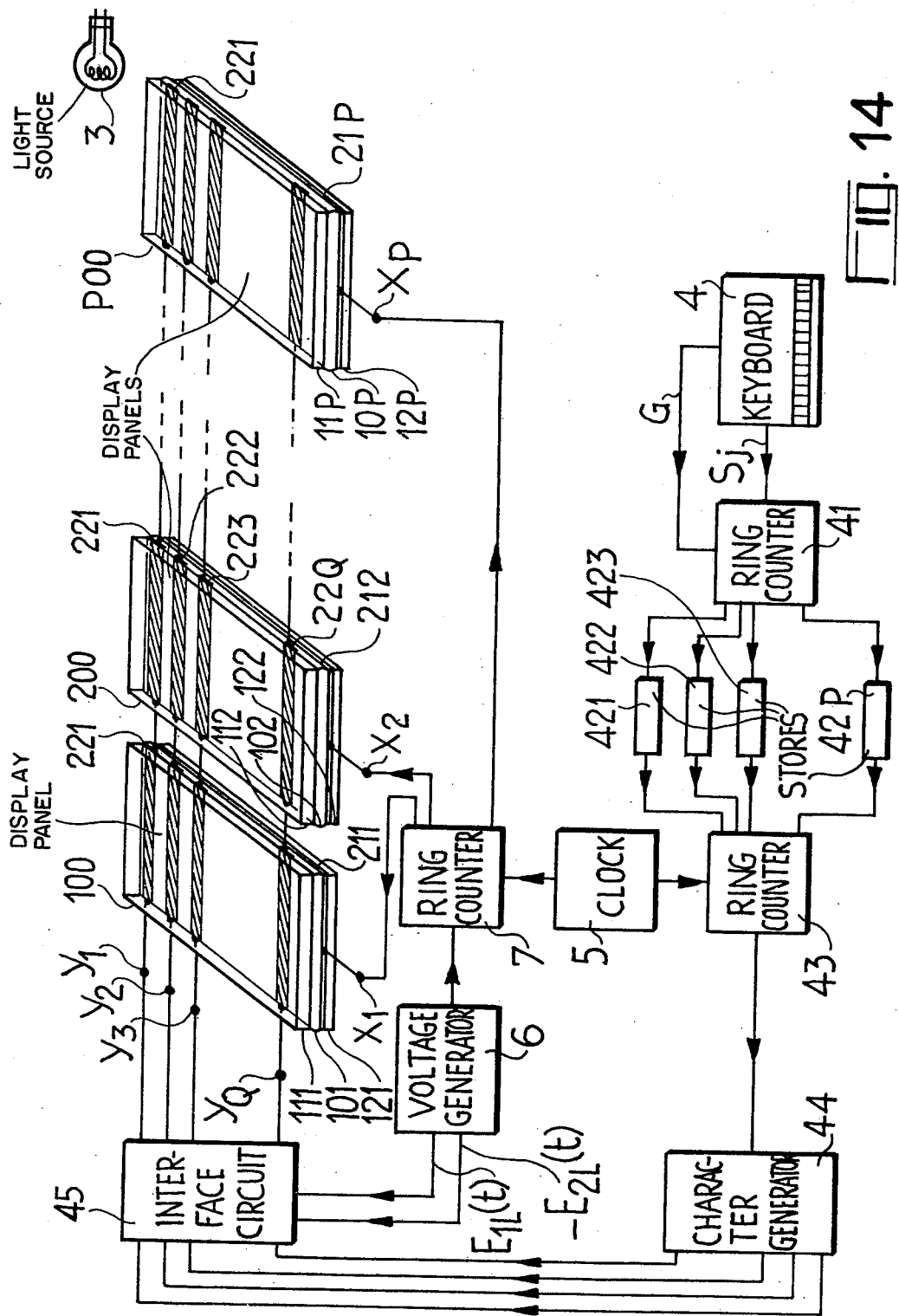

FIGS. 5 and 6 respectively describe the utilisation, by the prior art method, of the properties of dynamic diffusion and double-refraction, in nematic liquid crystals, for display purposes;

FIG. 7 illustrates a matrix made up of a set of elementary liquid crystal cells, utilised in accordance with the invention;

FIG. 8 illustrates a segmental display panel, utilised in accordance with the invention;

FIG. 9 is an explanatory diagram pertaining to a method of connecting the electrodes of an assembly of segmental display panels utilised in accordance with the invention;

FIGS. 10, 11 and 12 are explanatory diagrams pertaining to the operation of the devices in accordance with the invention;

FIG. 13 illustrates the utilisation in accordance with the invention, of superimposed nematic liquid crystal display panels employing the phenomenon of double refraction;

FIG. 14 illustrates a display device in accordance with the invention, comprising nematic liquid crystal display panels and associated electrical control elements which use the multiplex technique.

Those skilled in the art will be aware that the term liquid crystals is applied to certain special kinds of organisation, intermediate between the disorder of the liquid and the order of the crystal, which manifest themselves in the case of certain compounds in a more or less narrow temperature range, by the occurrence of a viscous state. Nematic liquid crystal are characterised by alignment parallel to the direction of their own longitudinal extent, on the part of the elongated molecules of which they are composed.

Figure 1:
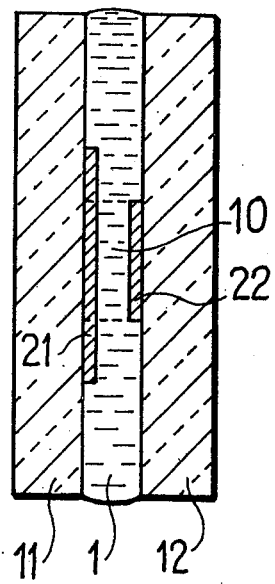
FIG. 1 illustrates a section through a liquid crystal cell of prior art type.

As the sectional view of FIG. 1 shows, a liquid crystal cell is formed by using a suitably chosen compound 1 to fill the gap, of approximately 10 micrometers, defined between two glass plates 11 and 12 arranged parallel with one another and partially or wholly coated on their mutually opposite faces with electrodes 21 and 22, at least one of these being transparent (made for example of tin oxide $Sn\,O_2$) the other being transparent or reflective; the compound may for example be an equimolecular mixture of methoxybenzylidene-butyl-aniline (or MBBA) and ethoxybenzylidene-butyl-aniline (or EBBA) which has a nematic structure phase between 0° and 60° C. By means of certain precautions, for example scratches in the surfaces which are in contact with the nematic crystal, or the introduction into the nematic substance of traces of a surface-active agent, it is possible to obtain over the whole surface of the cell, uniform orientation of the molecules, either parallel or perpendicular to the plates. The cell then, in the absence of any voltage applied to the electrodes, presents uniform optical properties and is, in particular, perfectly transparent.

If a direct voltage is applied between the two electrodes 21, 22 and progressively raised from zero, then in the region 10 between the two electrodes, the following phenomena are observed:

i. up to a threshold value $E_{1S}$, the cell remains uniformly transparent. An examination between polorizers indicates that the double-refraction remains constant; this double-refraction is zero if the molecules have been orientated perpendicularly to the plates; it has a certain value, characteristic of the material and of the thickness of the gap between the plates, if the molecules are parallel to the latter; in other words, the elongated molecules constitute a uniaxial and highly double-refracting medium, the optical axis of which is parallel to the common direction of alignment.

ii. between said first threshold value $E_{1S}$ and the second $E_{2S}$, although the transparency of the cell remains unmodified, a gradual change in the double-refraction is observed if the initial orientation of the molecules has been suitably selected as a function of the material; the double refraction increases in the case of perpendicular orientation and decreases in the case of parallel orientation. The reason for this is that the nematic crystal is made up, of highly polarizable molecules, the polarization vector, depending upon the materials used, being directed either in the direction of the longitudinal extent of the molecule, or perpendicularly thereto. If the molecules are aligned parallel to the plates, they then have maximum double refraction; if the polarization vector is then perpendicular to the longitudinal axis, and therefore to the plates, the fields created by the electrodes, parallel to the polarization direction, has no effect upon the orientation of the molecules; by contrast, if the polarization vector is parallel to the longitudinal axis, the field tends to rotate the molecules and the double refraction effect reduces. An identical consideration to this shows that if the molecules are orientated perpendicularly to the plates, the field only has an effect if the polarization vector is perpendicular to the longitudinal direction and thus causes the double refraction of the cell to increase.

iii. if the voltage applied exceeds said second threshold value $E_{2S}$ the liquid crystal zone defined between the electrodes, although initially transparent, produces progressively more and more diffusion. This phenomenon, known as "dynamic scattering" conceals the double refraction phenomenon and is associated with the existence of a certain conductivity within the body of the liquid crystal; beyond a certain threshold, the charge carriers disorganise the liquid crystal progressively more and more, and the crystal splits up into agglomerations of molecules which exhibit orientations progressively more and more radically different in relation to one another.

Figure 2:
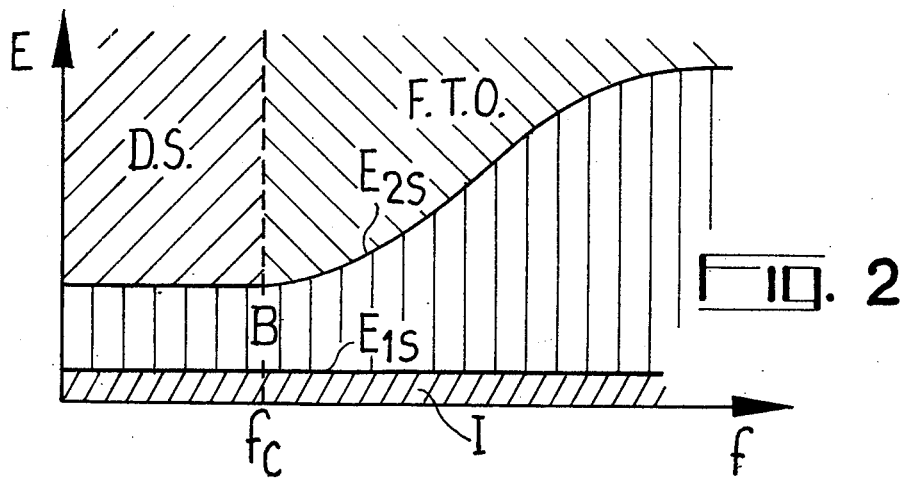
FIGS. 2, 3 and 4 are explanatory diagrams relating to the nematic liquid crystal electro-optical properties affecting the operation of the devices in accordance with the prior art or with the present invention.

FIG. 2 illustrates the variation of the threshold voltages $E_{1S}$ and $E_{2S}$ as the frequency f of the voltage applied to the electrodes is varied from a value corresponding to the direct voltage. The voltage $E_{1S}$ remains virtually constant; the voltage $E_{2S}$ varies slightly up to a characteristic value $f_c$ and, beyond this value, follows a law approximately proportional to the square root of the frequency. It is likewise seen that beyond this frequency $f_c$, the phenomenon of "dynamic scattering" gives way to a new phenomenon, known at "fast turn off," corresponding to oscillation of the molecules at a frequency double that of the field; this oscillation disturbs the double-refraction phenomenon and alters the transparency of the crystal without, however, giving rise to any phenomenon which can be practically exploited, in the manner which is possible in the case of dynamic diffusion.

Thus, in the voltage-frequency diagram of FIG. 2, four regions can be seen, distinguished by the inclinations of the cross-hatched zones and corresponding to different kinds of physical behaviour on the part of the nematic crystal:

the region I in which the crystal remains transparent and isotropic;

the region B where the double-refraction phenomenon occurs;

the region DS where the phenomenon of dynamic scattering is observed;

the region FTO where the phenomenon of fast turn-off is observed.

Figure 3:
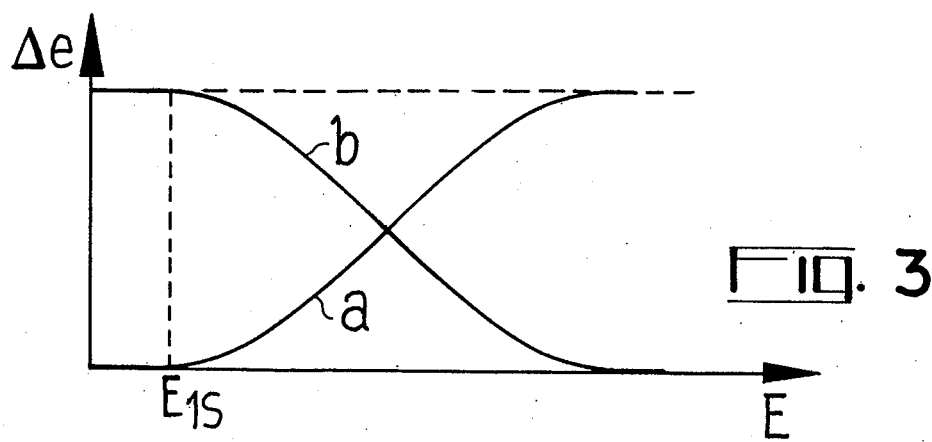

In FIG. 3, two curves can be seen which represent variation, as a function of the voltage E applied to the cell, of the path difference $\Delta\,e$, due to double-refraction, between the ordinary and extraordinary rays exiting from the cell. These two curves relate to two different materials, one having its molecules orientated perpendicularly to the plates (curve $a$), the other parallel thereto (curve $b$); it has been assumed in this example that the two materials exhibit the same difference between ordinary and extraordinary refractive index, the same threshold voltage and that their molecules rotate through the same angle when the same voltage is applied. The curves are identical whatever the frequency of the applied voltage and tend towards a plateau, beyond a certain voltage level. However, as explained earlier, the variation in the double refraction, which can be echieved in a cell, is limited to low frequencies by the appearance above the threshold $E_{2S}$, of dynamic scattering or fast turn off phenomena. Thus, if wide variations in double refractions are to be obtained, it is desirable to apply to the cell a voltage which has a sufficiently high frequency.

By way of example, a number of characteristic values will be quoted for a thin film having a thickness of around 10 microns, made up of an equimolecular mixture of MBBA and EBBA. The threshold at which the double refraction phenomenon appears ($E_{1S}$) is in the order of 5 volts; the threshold at which dynamic scattering appears ($E_{2S}$) is in the order of 7 volts for frequencies below a value $f_c$ in the order of 500 c/s; beyond this frequency, as FIG. 2 shows, $E_{2S}$ rises progressively in proportion to the square root of the frequency.

As far as the phenomenon of double refraction, in particular, is concerned, this mixture makes it possible to achieve a variation in the path difference, as a function of the voltage applied, which is similar to that illustrated by curve A in FIG. 3, where the plateau, corresponding to a path difference of four wavelengths for yellow, is reached at a voltage in the order of 30 volts. It will be seen that both in terms of double refraction and in terms of dynamic scattering, it is possible to achieve substantial electro-optical effects, using only very small voltages.

Figure 4:
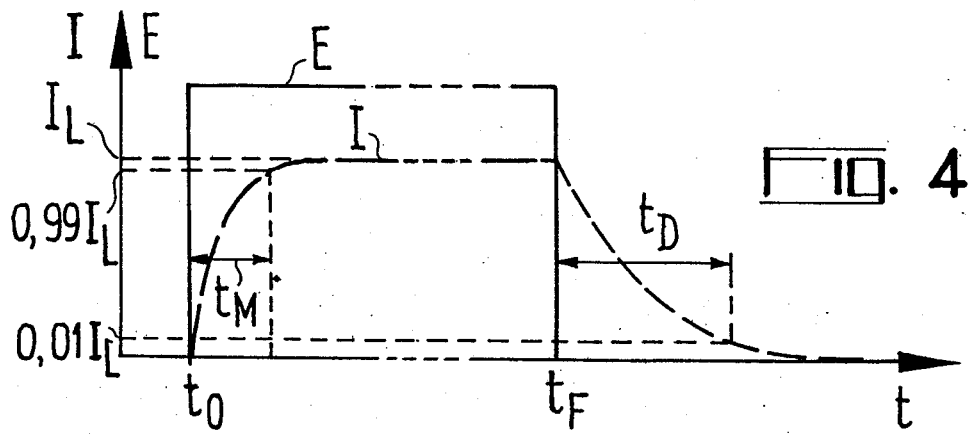

FIG. 4 relates to the variation, as a function of time, in the optical phenomena of double refraction or dynamic scattering, in association with the application of a voltage between the electrodes of a nematic crystal cell. On this figure there have been plotted as a function of time on the one hand the value of the voltage E applied between the electrodes and on the other a quantity I measuring the optical phenomenon, double refraction or diffusion, which arises from the application of the voltage. The voltage may either be a direct voltage of value E or alternating voltage of peak amplitude E. It is observed that if a step voltage, varying suddenly from O to E at the instant $t_0$, and constant thereafter, is applied, the quentity I takes a certain time to establish; similarly, if, at the instant $t_F$, the voltage is cut off, the optical phenomenon takes a certain time to disappear. The establishment and disappearance of the phenomenon, which is due to complex mechanisms, are not dictated by exponential time-based laws and it is therefore impossible to define a time constant; consequently, a rise time $t_M$, which is the time taken by the phenomenon to reach 99 percent of its limiting value $I_L$ and a decay time $t_D$, which is the time taken for it to revert to 1 percent of this value will be only defined. It is found that:

whatever the phenomenon, double refraction or diffusion scattering, the value of $t_D$ is always greater than that of $t_M$ when high voltages are applied to the cell;

the value of $t_M$ decreases very markedly if the interval between the applied voltage and the threshold voltage is increased, whilst the value of $t_D$ remains virtually constant; the ratio $t_D/t_M$ is therefore a rising function of the difference $E - E_S$.

it is possible to obtain, by utilising the phenomenon of double refraction, much shorter rise times than are possible when utilising the dynamic scattering phenomenon.

FIG. 5 and 6 illustrate how these optical properties of nematic liquid crystals can be implemented in a display device utilising a cell, such as that described in FIG. 1, which is controlled by a generator delivering a voltage E. It will be assumed that the electrode 22 is transparent and represents a graphic symbol which is to be made to appear or disappear by electrical control, the electrode 21 opposite it being either uniform or identical to 22.

In FIG. 5, an example of the implementation of the dynamic scattering phenomenon has been illustrated, in which the two electrodes 21 and 22 are assumed to be transparent. An absorbent black background 110 is arranged behind the plate 11; the cell is illuminated through the plate 12 and the electrode 22, either by a light source or by the ambient light. As long as the control voltage E is below the threshold voltage $E_{2S}$, the cell appears uniformly black and any ray such as that $R_1$, is absorbed by the background 110 after traversing the transparent assembly constituted by the liquid crystal, the plates and their electrodes; by contrast, as soon as the voltage exceeds the threshold level, the region 10 located between the electrodes diffuses the illuminating light (represented by the ray $R_2$) and an observer located at the same side of the source, in relation to the cell, will then see the graphic symbol represented by the electrode 22 in the form of a bright figure against a black background, the contrast being the better the higher the voltage E and therefore the greater the dynamic scattering in the crystal. It is also possible, as FIG. 6 shows, to utilise a liquid crystal cell by exploiting its double refraction properties. The cell is then illuminated with rectilinearly polarized parallel light, produced for example by a source 3 arranged at the focus of the optical system 30 associated with the polarizer 31; equally, a laser source can be used which emits a parallel beam of polarized light. An analyser 32, in a crossed arrangement with the polarizer, picks up the light emerging from the cell.

If the molecules are orientated perpendicularly to the plates and if the source emits monochromatic radiation of wavelength λ, the cell will appear uniformly black as long as the voltage remains below the threshold $E_{1S}$; once this value is exceeded, the region 10 located between the electrodes becomes more and more double-refracting (curve $a$ of FIG. 3); the graphic symbol represented by the electrode 22 then appears as a brighter and brighter symbol against a black background, until the path difference introduced by the crystal is equal to λ/2, thereafter becoming progressively darker; the graphic symbol ceases to be visible again, at a path difference of λ. By thus continuing to increase the voltage, the graphic symbol is made to pass alternately through peaks of brightness at path differences equal to an odd number of half wavelengths, followed by extinction at all path differences equal to a whole number of wavelengths. If the cell is illuminated with white light, then by increasing the voltage the different regions of the spectrum are successively picked out and the graphic symbol appears in colour against a black background, the colour being a function of the applied voltage.

The phenomena are slightly different if the molecules are orientated parallel to the plate; as FIG. 3 shows, in curve $b$, the double refraction of the cell is at a maximum below the threshold voltage $E_{1S}$ and decreases thereafter with the applied voltage E, turning in fact towards 0. Also, for voltages below the threshold, the cell, when illuminated with monochromatic light, does not appear uniformly black unless its thickness is strictly calculated so that the path difference introduced between the two polarizations, is equal to a precise number of wavelengths; in any other case, the cell appears more or less luminous, but uniformly so; illuminated with white light, the cell will appear uniformly coloured. If the voltage is raised above the threshold, the double refraction in the region 10 diminishes in relation to the neighbouring regions and the graphic symbol appears; the same phenomena are then encountered, both when using monochromatic light and white light, as in the case where molecules are orientated perpendicularly to the plate.

The foregoing examples illustrate how the electro-optical properties of the nematic crystals can be used to produce the appearance or disappearance, under electrical control by a single pair of electrodes, of a given graphic symbol. In practice, it is necessary to multiply the number of independent electrodes on one and the same cell in order to make it able to successively display different graphic symbols, and possibly to arrange side by side a certain number of multi-electrode cells. In this fashion, one arrives at control systems which are the more complex the higher the number of independent electrodes. It is precisely the object of the present invention to simplify the electrical control devices of display panels employing such nematic liquid crystal cells, by utilising, through an appropriate application of the properties hereinbefore set out, the method known by the name of multiplexing.

FIG. 7 illustrates the principle behind the multiplexing method in the particular case of application to a matrix made of a P×Q elementary nematic crystal cells.

In this figure, a display panel can be seen which is constituted by two parallel transparent plates 11 and 12 betwen which there has been introduced a thin nematic liquid crystal film. The internal face of the plate 11 comprises P transparent electrodes 211, 212 ... 21 P, known as column electrodes, arranged in the form of regularly spaced parallel strips and each connected to a terminal, respectively $X_1, X_2 ... X_p$, known as the column terminal; similarly, the internal face of the plate 12 comprises Q similar electrodes 221, 222 ... 22 Q, known as row electrodes, disposed perpendicularly to the former ones and each connected to a terminal known as the row terminal, $Y_1, Y_2 ... Y_Q$. Thus, at the intersection between each row and each column, an elementary cell identical to the cell represented in FIG. 1, is created. The assembly of the P×Q elementary cells thus formed: $C_1^1 ... C_Q^P$ can be supplied to (P + Q) connections whereas it would have required 2 (P×Q) if the matrix had been formed by arranging independent cells side by side.

It will be seen, however, that this simplification in the connections is not without certain problems concerning the control of each elementary cell.

A first difficulty arises as soon as it is required to control, within the matrix, a single cell $C_N^M$, belonging to column M and row N. All the terminals, with the exclusion of the $M^{th}$ column terminal and the $N^{th}$ row terminal being maintained at a common potential $V_R$, there is applied to the $M^{th}$ column terminal a control voltage $E_C$ which raises a corresponding electrode to the potential $V_R + E_C$, and to the $N^{th}$ row terminal a control voltage $-E_L$ which raises the $N^{th}$ row electrode to the potential $V_R - E_L$. The cell $C_N^M$ will then be subjected to the voltage $E_L + E_C$, but then, simultaneously, all the cells in the $M^{th}$ column will experience the voltage $E_C$ and those of the $N^{th}$ row the voltage $E_L$, the rest of the cells carrying 0 voltage. A device of this kind cannot therefore be employed unless the elementary display cells have a threshold voltage below which no signal appears, and this is the case, as explained hereinbefore, with nematic liquid crystal cells. Thus, by choosing the voltages $E_C$ and $E_L$ below or equal to the threshold voltage, it can be arranged that only the cell $C_N^M$ produces a signal.

This condition of the existence of a threshold voltage being satisfied, a second difficulty arises which manifests itself where it is desired to simultaneously control two cells $C_N^M$ and $C_{N'}^{M'}$ of the matrix; it will be seen that this cannot be done without simultaneously operating the cells $C_{N'}^M$ and $C_N^{M'}$ except where the two cells are located in the same column (M = M') or in the same row (N = N').

The multiplexing method makes it possible to overcome this latter difficulty by utilising the integrating properties of the human eye. This is done by sequentially operating the different columns (or the different rows) of the matrix. To do so, a common reference potential $V_R$ is defined for the row and column electrodes and, during a first time period of duration $t_1$, the control voltage $E_C$ is applied to the first column electrode 211 of the matrix, thus raising it to the potential $V_R = E_C$, the assembly of the other column electrodes being maintained at the potential $V_R$; during the same time period, supposing that in the first column, the cells which are to be made to light up are cells $C_2^1, C_M^1, C_Q^1$, the control voltage $-E_L$ will be applied to the row electrodes 222, 22M, 22Q which will thus be raised to the potential $V_R - E_L$, the other row electrodes being maintained at the potential $V_R$. Then, during a second time period, consecutive with the first and of the same duration $t_1$, the column electrode 211 will be brought back to the common potential $V_R$; the control voltage $E_C$ will be applied to the next column electrode 212; during this same time period, the row electrodes 222, 22M, 22Q will be returned to the common potential $V_R$ and the row control voltage $E_L$ will be applied to the electrodes 224, 22N if it is the cells $C_4^2, C_N^2$ which are to be made to light up in the second column. The same procedure will be adopted with all the successive electrodes of the matrix in order, at the end of a time $T = Pt_1$, to then reapply the voltage $E_C$ to the column electrode 211 and the voltage $E_L$ to the same row electrodes 222, 22M, 22Q as before. Assuming that the rise and the decay times, $t_M, t_D$ respectively, of the optical phenomenon exploited in each cell, are short compared with $t_1$, it will be seen that one and the same elementary cell, $C_M^1$ for example, will emit light pulses of duration $t_1$, at a recurrence frequency of T. It is therefore merely necessary for T to be less than around 50 ms, in order to create for the eye the impression that the elementary cell is being illuminated continuously, this due to retinal persistance. It should be pointed out here that it is the row electrodes which make it possible to control the lighting up or extinction of the different elementary cells. It should be pointed out, too, that the potential difference applied between the electrodes of one and the same elementary cell, takes three different values during a period T : $E_C + E_L$, $E_L$ and 0, when cell is lit up with the sequential application of the control voltage to the electrode of the column to which it belongs, and $E_C$, $E_L$ and 0 if the contrary is the case. In accordance with one feature of the invention, therefore, values (which may be positive or negative) of $E_C$ and $E_L$ will be chosen so as to be less than or equal to the threshold voltage.

FIG. 8 an 9 illustrate how it is possible to apply this multiplexing method to a numerical or alpha numerical several segments display panel.

FIG. 8 illustrates a several segments display panel. In accordance with the general diagram of FIG. 1, it comprises a thin liquid crystal film 1 enclosed between two transparent plates 11 and 12. The internal face of the plate 11 is coated over the whole of its area with a continuous electrode 21; on the internal face of the plate 12 independent electrodes 221, 222, ... 22Q, are arranged in the form of rectilinear segments, each constituting with the particular opposite part of the electrode 21 and the liquid crystal region enclosed between them, a corresponding number of elementary cells. In accordance with the number of segments arranged in the panel, it is possible, by applying the control voltage to selected segments, to display, as required, either one of the digits of the decimal system (numerical panel), the numeral 2 having been illustrated by way of example in the figure, or one of said digits or an arbitrary letter of the alphabet (alpha-nemerical panel). It is a common practice to arrange several such panels side by side in order, for example, to display a piece of digital data or a message.

FIG. 9 illustrates how it is possible to connect with one another the multiple electrodes of this kind of assembly of P identical panels, 100, 200 . . . POO, in order to be able to utilise the multiplexing method. In this figure, to facilitate understanding and to underline the analogy with the matrix shown in FIG. 7, the different segments of one and the same panel have been shown parallel to one another. The common electrodes of the panels 100, 200 . . . POO, namely 211, 212 . . . 21P respectively, are each connected to respective independent terminals $X_1$, $X_2$ . . . $X_p$, said terminals X being grouped to form P column terminals. The identical segments of each panel are connected to one and the same terminal, for example the P segment 221 to terminal $Y_1$, said Y terminals being grouped to form Q row terminals, respectively $Y_1$, $Y_2$ . . . $Y_Q$. Thus, from the electrical point of view, a device is obtained which at all points is identical to that of FIG. 7 and can therefore be controlled in the same fashion. Each panel corresponding to a column in the matrix of FIG. 7 will be made to light up sequentially, for a time $t_1$ and a recurrence periodicity T, the control of these segments which are to be lit up in each panel, and therefore of the character which is to be displayed there, being effected by the row terminals.

One of the features of the invention pertains to the values of the control voltages to be applied to the column electrodes, or in other words $E_C$, or to the line electrodes, in other words $E_L$, which values will both be taken to be equal to a common value $E_S$; depending upon whether the cell employs the properties of double refraction or dynamic scatter in the liquid crystal, this voltage $E_S$ will have one of the threshold values defined by the graph in FIG. 2, namely $E_{1S}$ or $E_{2S}$. Still in accordance with the invention, this voltage $E_S$ may either be a direct voltage or an alternating voltage.

FIG. 10, illustrates as a function of time, for one and the same cell and during the time period $t_1$ for which it is lit up, and for the case where $E_S(t)$ is a squarewave function of periodicity much lower than $t_1$:

the variation in the potential $V_C = V_R + E_S(t)$ on the column electrode (graph a);

the variation in the potential $V_L + V_R - E_S(t)$ on the row electrode (graph b);

and the variation in the potential difference $V_C - V_L = 2E_S(t)$ to which the liquid crystal comprised between the two electrodes is subjected (graph c).

It will be seen that in the case of an alternating voltage, the application of a control voltage $E_S(t)$ to the column electrode and of the control voltage $-E_S(t)$ to the row electrode comes down to the application to the electrodes of voltages which are the same but are out of phase by 180°.

Still in accordance with the invention, a multiplexing device can be applied either to a panel constituted by a matrix of elementary cells, as described in FIG. 7, or to an assembly of several segments panels similar to those shown in FIG. 8, by utilising either the dynamic scattering phenomenon (FIG. 5) or that of double-refraction (FIG. 6). Depending upon how the cell is utilised, the graphic symbol to be displayed will then appear:

in the case of dynamic scattering, as a graphic symbol in white on a black background;

in the case of double refraction: molecules orientated perpenducularly to the substrate, in colour of a black background;

in the case of double refraction, molecules orientated parallel to the substrate, as brighter or dimmer symbols than the background if monochromatic light is used for illumination, and in colour on a coloured background if white light is used for illumination; but in both these latter cases it is always possible to obtain a graphic symbol appearing in colour on a black background, by adding a compensating plate to the cell.

This distribution of control voltages in a multiplexing device, although having the advantage that it only requires low voltages, nevertheless involves a variety of difficulties where its actual application is concerned:

it limits the voltage applied to the cells to a low value; the optical phenomena employed are their of low intensity and the contrast between the elements which have lit up and the extinguished elements, is poor; furthermore, the rise and decay times of the cells, $t_M$ and $t_D$, are longer than they would be with a higher voltage;

it means that it is only possible to use nematic liquid crystals whose rise times are shorter, in operation, than the duration $t_1$ of the pulses; in other words, if this condition is not satisfied the optical effect has insufficient time to establish fully, during the time of the pulse; moreover, since the voltage across the terminals in one and the same cell varies, outside the time period $t_1$ (repeated with the periodicity T) during which it lights up, between the values $E_S$ and 0 depending upon whether the cells in the same row are to light up or be extinguished, the value of the voltage pulse controlling lighting up will, depending upon the circumstances, have one of the two values $E_S$ or $2E_S$; the intensity of the optical effect achieved, during the time $t_1$ of the pulse, thus essentially depends upon what is required of the cells in the same row.

To overcome these drawbacks, it is proposed in accordance with the invention that the following variant embodiment be resorted to, with regard to the distribution of the control voltages employed in a multiplexing device applied to a nematic liquid crystal display device.

In accordance with this variant embodiment, and as before using the notation $E_C$ to designate the control voltage (direct or alternating) applied sequentially to the column electrodes, a control voltage of $-(E_C/2)$ is applied to the row electrodes corresponding to the cells which are to light up in the column subject to the control voltage; simultaneously, to the other row electrodes, a voltage of $+(E_C/2)$ is applied. In other words, it will be seen that said variant embodiment consists in choosing for the column electrodes a common reference potential $V_R$ and for the row electodes a different potential: $V_L = V_R + E_C/2$,) whilst at the same time sequentially applying to the columns the control voltage $E_C$ (causing their potential $V_C$ to vary from $V_C = V_R$ to $V_C = V_R + E_C$) and to the rows the control voltage $-E_L = -E_C$ (causing their potential $V_L$ to vary from $V_L = V_R + (E_C/2)$ to $V_L = V_R - (E_C/2)$.) Accordingly, the voltage $V_C + V_L = (3/2) E_C$ is sequentially applied during a time period $t_1$, to all the "lip up" cells in the same column. Simultaneously, all the other cells of the device are subjected to a potential difference $V_C - V_L = \frac{1}{2} E_C$. FIG. 11 shows, in the case where $E_C$ is a direct voltage, the variation in the voltage $V_C - V_L$ applied to the terminals of an elementary cell when it is switched, at the instant $t_0$, from the extinguished state to the lit state. When "extinguished," the cell permanently carries the voltage $V_C - V_L = (E_C/2)$ at its terminals. From the instant $t_0$ at which it "lights up" and during the time period $t_1 = (T/P)$, this being repeated with a periodicity T, the voltage $V_C - V_1 = (3E_C/2)$ is applied to the cell.

Between these pulses, or in other words during the times $T - t_1$, which are repeated at a periodicity T, the potential across the terminals of the cell is returned to a value $V_C - V_L = (E_C/2)$.

Thus, compared with the version described initially, this variant embodiment has two fundamental advantages:

a uniform voltage is applied across the terminals of all the unlit cells;

a voltage three times higher is applied across the terminals of the cells which are lit up.

The variant embodiment can be utilised both in a cell matrix and in a multi-segments panel arrangement, operating either by double refraction or by dynamic scattering, giving the voltage $E_C$ a value at the most equal to twice the threshold voltage, $E_{1S}$ in the case of refraction, $E_{2S}$ in the case of dynamic scattering. The display offects are thus the same as those hereinbefore described in relation to the initial version. However, the unlit cells are then uniformly placed at the voltage $E_S$ so that the lighting pulse has a single value $2E_S$ and it then becomes possible, in accordance with one feature of the invention, to work with pulses whose duration $t_1$ is shorter than the rise time $t_M$ of the cell.

FIG. 12 illustrates how, in this case, the quantity I varies in the course of the time T, this quantity characterising the intensity of the optical phenomenon exploited for an elementary cell which is switched at the instant $t = t_0$ from the extinguished state to the lit state. We will assume that $E_C$ is given the value $2E_S$. Under these circumstances, the cell, which is previously experiencing a voltage at the most equal to the threshold voltage $E_S$, is besides subject, through the whole of the time for wich it is lit, to voltage pulses of amplitude $2E_S$, duration $t_1$, repeated at a periodicity T; the voltage applied to a lit cell is then varying between the values $E_s$ and $3E_s$. $I_L$ will be used to designate the value which the quantity I would acquire if one and the same cell were subjected to the voltage $3E_s$ during a time much longer than the raise time $t_M$. During the first pulse, the quantity I increases, albeit without sufficient time to reach the limiting value $I_L$, up to a value $I_1$, then decreases without having time to revert to 0, down to the value $I'_1$, rises again to $I_2$ with the second pulse and then decreases again to $I'_2$. The increase at the time of the pulse N, namely $I_N - I'_{N-1}$ is the smaller the closer $I'_{N-1}$ approaches to $I_L$; by contrast, the decrease after the pulse, namely $I_N - I'_n$ is the greater the closer $I_N$ is to $I_L$. The value of I tends towards an equilibrium value $I_N = k I_L$ (where $k \leq 1$) when:

$I_N - I'_{N-1} = I_N - I'_N$

Roughly speaking, k depends solely upon the ratio $t_1/T$, and is the closer to unity the higher the ratio $t_1/T$. However, we have seen from the foregoing that:

$$t_1/T = 1/P$$

P being the number of columns in the matrix, which are to be multiplexed. There is thus a limitation upon the number of columns or panels which can be multiplexed in this way, dictated by the requirement that in order to obtain adequate contrast, k must not have too small a value.

Still in accordance with the invention, it is possible to obviate this latter difficulty by utilising the possibility of double-refraction operation and giving the voltage $E_C$, in accordance with the variant embodiment hereinbefore described relating to the distribution of the multiplexing voltages, a value greater than twice the threshold voltage. If the cell lighting utilises monochromatic light, then the value of $E_C$ will be arranged so that the cells experiencing the voltage $(E_C/2)$ (unlit cells) produce a path difference equal to a whole number of wavelengths; the lit cells will then appear bright against the black background. It is also possible to illuminate the cells by white light; the lit cells and extinguished cells are then distinguished by their colour and $E_C$ will be chosen so that the contrast between the two colours is adapted in the best possible way to the requirements of the eye.

It then becomes possible to compensate for small values on the part of the ratio $k$, by using high values of $E_C$, and it is thus possible to use small values of the ratio $t_1/T$ and to apply multiplexing to a larger number P of columns. Under these operating conditions, the maximum phase differences introduced by the cell, between ordinary and extraordinary rays, is that which will be brought about by a voltage $(1 + 2k) E_C$ applied continuously. Referring to the graph of FIG. 2, it will be seen that it is convenient to choose the value of the voltage $E_C$ so that:

$$(1 + 2k) E_C < E_{2S}$$

$E_{2S}$, for the frequency $f$ used, being the threshold value beyond which dynamic scattering phenomena occur. It is therefore advantageous to utilise for multiplexing, a control voltage of high frequency $f$, in order to be able to apply substantial voltages $E_C$ whilst remaining within the double refraction range of the liquid crystal.

In fact, the frequency of the control voltage is limited in the upward direction by the existence, in the case of each elementary cell, of an electrical time constant RC, where R is the resistance of the voltage leads of each cell, and C the capacitance of an elementary cell; at the current state of the art, the order of magnitude of this limiting frequency is some few tenths of kc/s only. At these frequency values, the limiting value to be given to $E_C$ is thus imposed rather by the breakdown voltage between electrodes, than by the threshold value $E_{2S}$.

Another advantage associated with this latter mode of operation in accordance with the invention, resides in the reduction of the rise and decay times, $T_M$ and $t_D$, of the elementary cells. In other words, as pointed out hereinbefore, the values of $t_M$ and $t_D$ are the smaller the greater the difference between the control voltage and the threshold voltage.

By way of example, matrices of cells have been built using equimolecular mixture of MBBA and EBBA, forming a film 7 microns thick. The control voltage applied to the electrodes had a frequency of 10 Kc/s. The cells are operated in the double refraction range, the value of $E_C$ being 12 volts and illuminated by white light; the "extinguished" cells transmitted a second order red and the "lit" cells a third order green. The rise times $t_M$ were in the order of 2ms and the decay times $t_D$, in the order of 40ms, the ratio $k$ in the order of 0.6. It was thus possible to use multiplexing to control 20 columns simultaneously, with a quite inexpensive electronic arrangement.

Identical elements, subjected however to a control voltage of $E_C = 100$ volts, enable 100 columns to be multiplexed and therefore make it possible, at the expense of a more elaborate electronic system of course, to produce flat screens, image displays for holographic stores, optical calculators, etc.

FIG. 13 illustrates how, in accordance with a variant embodiment of the invention, it is possible, by superimposing two display panels utilising the double refraction phenomenon, to display graphs in three or four colours.

In this figure, the polychromatic light source 3, using light rendered parallel by the lense 30, illuminates to two panels 101 and 201 which, by way of example, may be two panels similar to that described in FIG. 7, identical to one another or differing from one another purely in terms of the thickness of the liquid crystal film. The two panels are viewed between a crossed polarizer 31 and an analyser 32. The multiplexing can be carried out in series or in parallel, on the two panels.

It is also in accordance with the present invention, to arrange side by side, in the field of the lightbeam emitted by the lense 30, several combinations of thus superimposed panels.

FIG. 14 illustrates by way of non-limitative example, a complete display asembly in accordance with the invention, comprising the liquid crystal display panels, the element for selecting the characters which are to be displayed, and the associated multiplex control device. The P display panels 100, 200 . . . POO, are assumed to be panels with numerical or alphanumerical segments, identical with one another and similar to the panel of FIG. 8; each panel comprises:

a pair of plates: 111 and 121, 112 and 122 . . . 11P and 12P, enclosing a thin nematic liquid crytal film, 101, 102 . . . 10P:

a common electrode: 211, 212, . . . 21P lining the whole surface of one of the plates;

and on the other plate, Q separate electrodes, or segments, such as those 221, 222 . . . 22Q on the panel 200, said electrodes here, simply in order to make the drawing easier to comprehend, being shown parallel to one another.

A radiation source 3 illuminates the assembly of panels.

The connections to the panels are in accordance with the diagram 10 of FIG. 9; the P common electrodes 211, 212 . . . 21P, are each connected to a separate terminal, respectively $X_1$, $X_2$, $X_P$, said terminals being known as the column terminals. The identical segments of each panel, for example the P segments 221, are connected to one and the same terminal, in this case $Y_1$. There are thus as many separate terminals, known as row terminals, as there are separate segments per panel, namely Q row terminals.

The characters to be displayed by the panels, are assumed to be selected by the keyboard 4 which comprises as many keys as there are separate characters capable of display by each individual panel (for example 10 keys corresponding to the 10 digits of the decimal system, if the panels are numerical panels similar to that of FIG. 8, thus making it possible by an appropriate combination of segments to display one of said 10 digits; this keyboard produces two types of signals, on the one hand a signal G every time a key is depressed, and on the other a signal $S_J$ in binary coded form, characteristic of the key depressed and therefore of the character to be displayed.

The associated multiplex control device comprises a clock 5, a voltage generator 6, the voltages, namely $E_{1L}(t)$, $-E_{2L}(t)$, $E_C(t)$, being for example direct voltages, alternating squarewave voltages, etc., and first and second electrical bias means, respectively associated with the row and column terminals of the display panels and supplying them with suitable control signals.

The first bias means are constituted by:

a first ring-counter 41 arranged at the output of the keyboard 4 and supplied with the signals G and $S_J$ furnished by the latter;

stores 421, 422 . . . 42P, in a number P equal to the number of column terminals, each store input being connected to an output of the counter 41;

a second ring counter 43 supplied with the clock pulses 5 and connected furthermore to the outputs of the stores;

a character generator 44, comprising an input connected to the output of the counter 43 and as many outputs, namely Q, as there are row terminals associated with the panels, that is to say independent segments in each panel;

an interface circuit 45, connected to the two outputs of the character generator 44 and controlling the Q row terminals $Y_1$, $Y_2$. . . $Y_Q$ ; this circuit also receives from the voltage generator the voltages $E_{1L}(t)$ and $-E_{2L}(t)$ which it applies to the appropriate row terminals;

The second bias means are constituted by a thirs ring counter 7, controlled by the clock pulses 5 and receiving from the voltage generator 6 the voltage $E_C(t)$ which it applies sequentially to the various column terminals $X_1$, $X_2$ . . . $X_p$.

The values to be given to the voltages $E_C(t)$, $E_{1L}(t)$ and $E_{2L}(t)$ in accordance with the invention, have been described hereinbefore. It will be remembered that it is possible to use:

either $E_{2L}(t) = E_C(t)$ $E_{1L}(t) = 0$ ;

or, in accordance with the variant embodiment, $E_{2L}(t) = E_{2L}(t) = (E_C/2)(t)$ the voltage $E_C(t)$ being either a direct voltage: $E_C(t) = E_C$. or an alternating voltage, for example: $E_C(t) = E_C \sin 2\pi ft$; in the latter case, as emphasized before, the application of the voltage: $-E_{2L}(t) = -E_C \sin 2\pi ft$ comes to the same thing as applying the voltage: − $E_{2L}(t) = E_C \sin(2\pi f t + \pi)$.

The operation of the display system will be described on the assumption that the panels are 7-segment numerical panels (FIG.8), that the panels number is 3 (P=3), and that it is desired to display a number, such for example as 857. The keys 8, 5 and 7 of the keyboard 4 are depressed successively; when the key 8 is depressed, the keyboard supplies a pulse G to the ring-counter 41 which then switches the keyboard to the store 421; consecutively, the keyboard 4 emits a series of pulses forming the signal $S_8$, coding the digit 8 in the binary system, which pulses are recorded in the store 421; then, the key 5 is depressed, the pulse key switches the keyboard of the store 422 which records the digit 5; in the same way, the store 423 records the digit 7.

The clock 7 simultaneously controls the ring counters 43 and 7 to which it supplies pulses succeeding one another at intervals of $t_1$; at the end of a time: $T = 3t_1$, each counter will have returned to its initial position. At the time of the $p^{th}$ pulse, the counter 7 applies the control voltage $E_C(t)$ to the terminal which is thus placed at the potential $V_R + E_C(t)$, for a period $t_1$, the terminals $X_2$ and $X_3$ being maintained at the potential $V_R$. Simultaneously, the counter 43 connects the store 421 to the character generator 44; the latter, on the basis of the coded signal coming from the store, controls the interface circuit 45 which, receiving the voltages $E_{1L}(t)$ and $-E_{2L}(t)$ from the voltage generator 6, applies to the row terminals corresponding to the segments which are to be "lit" in the first panel 100, this in order to form the digit 8, the voltage $-E_{2L}(t)$, and to the others the voltage $E_{1L}(t)$. The segments forming the digit 8 are thus lit for the time $t_1$ in the first panel, the other panels only containing "extinguished" segments. The pulse $p + 1$ supplied by the clock, acts through the counter 7 to switch the generator 6 from terminal $X_1$ to terminal $X_2$ and through the counter 43 to switch the generator 44 from the store 421 to the store 422; the first and third panels are extinguished and the second panel 200 displays the digit 5 for the time $t_1$. The pulse $p + 2$, in turn, causes the digit 7 to "light up" in the third panel 300. The sequence restarts with the pulse $p + 3$ which "lights" the first panel afresh, and so on. Each of the three panels is thus lit in turn for the time $t_1$ and "extinguished" during the time $2t_1$; if the period $3t_1$ is less than 50ms, then the eye of the observer, because of the phenomenon of retinal persistance, permanently sees the number 857 recorded upon the display device. To change the number display, it is merely necessary to modify the content of the stores, by operating the keyboard 4.

What we claim is:

1. An electrically controlled display device utilising a nematic liquid crystal and comprising:
   at least one pair of plates, said pair of plates enclosing a thin film of said liquid crystal;
   electrodes positioned on said plates for applying a transverse electrical bias to portions of said film; means for illuminating said film;
   P column and Q row electrical terminals, P and Q being whole numbers greater than unity;
   first and second electrical bias means;
   each said terminal being directly connected to at least one said electrode;
   said first and second bias means being respectively associated with said row and said column terminals;
   said second means successively applying to each of said P column terminals a control voltage $E_C(t)$, at a periodicity of T and for a time period of $t_1$ not exceeding T/P in order to successively raise the potential of said terminals, during said time period and at said periodicity, from a reference electrical potential $V_R$ to an electrical potential $V_R + E_C(t)$;
   said first means applying simultaneously to each of said row terminals at least one of the two control voltages $E_{1L}(t)$ and $-E_{2L}(t)$ for causing electrical potential variations of one and the same said row terminal from one to the other of the two values $V_R + E_{1L}(t)$ and $V_R - E_{2L}(t)$, each said variation, when occuring, being synchronous with the application of said voltage $E_C(t)$ to one of said column terminals;
   said control voltages $E_C(t)$, $E_{1L}(t)$ and $E_{2L}(t)$ being capable of varying as a function of time $t$ and having respective peak values $E_C$, $E_{1L}$ and $E_{2L}$;
   said transverse electrical bias applied to a said portion of said film being thus able to change from one to the other of the four values $-E_{L1}(t)$, $E_{L2}(t)$, $E_C(t) - E_{L1}(t)$ and $E_C(t) + E_{L2}(t)$;
   said film undergoing changes in magnitude of its optical effect when varying said transverse electrical field applied;
   said values $E_{L1}(t)$, $E_{L2}(t)$ and $E_C(t) - E_L(t)$ giving rise to a same first magnitude of said optical effect;
   and said value $E_C(t) + E_{L2}(t)$ giving rise to a second magnitude of said optical effect, said second magnitude being higher that said first magnitude.

2. A display device as claimed in claim 1, wherein said control voltage $E_C(t)$, $E_{1L}(t)$, $E_{2L}(t)$ are direct voltages having the said respective values $E_C$, $E_{1L}$, $E_{2L}$.

3. A display device as claimed in claim 1, wherein said control voltages $E_C(t)$, $E_{1L}(t)$, $E_{2L}(t)$, are alternating voltages of the same frequency and phase with respective peak amplitudes of $E_C$, $E_{1L}$, $E_{2L}$.

4. A display device as claimed in claim 3, wherein the waveform of said alternating control voltages is that of a squarewave.

5. A display device as claimed in claim 1, wherein said peak values $E_{1L}$ and $E_{2L}$ are respectively equal to 0 and to said peak value $E_C$.

6. A display device as claimed in claim 1, wherein said peak values $E_{1L}$ and $E_{2L}$ are equal to half said peak value $E_C$.

7. A display device as claimed in claim 1, wherein said peak values $E_{1L}$, $E_{2L}$ and the difference $E_C - E_{1L}$ between peak values $E_C$ and $E_{1L}$, are at the most equal to the threshold voltage beyond which the dynamic scattering phenomenon occurs in said crystal.

8. A display device as claimed in claim 1, further comprising polarization analyser means arranged to receive the light emerging from said film, said illuminating means producing polarized light.

9. A display device as claimed in claim 8, wherein said peak values $E_{1L}$, $E_{2L}$, and the difference $E_C - E_{1L}$ between said peak values $E_C$ and $E_{1L}$, are at the most equal to the threshold value beyond which the double-refracting phenomenon occurs in said crystal.

10. A display device as claimed in claim 1, wherein said electrodes are arranged on each plate in the form of parallel bands, the bands on two plates of one and the same pair being perpendicular to one another.

11. A display device as claimed in claim 1, wherein several said pairs of plates are arranged side by side, one plate of each pair being lined with a single electrode and the other plate comprising several electrodes in the form of segments, the various combination of said segments displaying various graphic forms.

12. A display device as claimed in claim 8, wherein at least two said pairs of plates are superimposed, at least on electrode being arranged on each plate.

* * * * *